United States Patent
Fuchs

(10) Patent No.: US 6,485,546 B2
(45) Date of Patent: *Nov. 26, 2002

(54) FILTERING DEVICE AND CARTRIDGES FOR FLUIDS AND GASES

(75) Inventor: Albrecht Fuchs, Zikhron Yaaqov (IL)

(73) Assignee: Beth-El Zikhron-Yaaqov, Zikhron Yaaqov (IL)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/493,234

(22) Filed: Jan. 28, 2000

(65) Prior Publication Data

US 2002/0069761 A1 Jun. 13, 2002

(30) Foreign Application Priority Data

Jan. 28, 1999 (IL) .................................................. 128263

(51) Int. Cl.⁷ ................................................ B01D 53/04
(52) U.S. Cl. ............................. 96/135; 96/137; 96/147; 96/153; 55/523; 55/524; 55/DIG. 33
(58) Field of Search ..................... 55/523, 524, DIG. 5, 55/DIG. 33; 96/135, 137, 147, 153, 154

(56) References Cited

U.S. PATENT DOCUMENTS

| | | | | |
|---|---|---|---|---|
| 3,217,715 A | * | 11/1965 | Berger et al. | 96/135 X |
| 3,538,020 A | * | 11/1970 | Heskett et al. | 96/153 X |
| 3,645,072 A | | 2/1972 | Clapham | 55/387 |
| 3,721,072 A | * | 3/1973 | Clapham | 96/153 |
| 4,386,947 A | * | 6/1983 | Mizuno et al. | 96/137 |
| 4,518,704 A | * | 5/1985 | Okabayashi et al. | 96/153 X |
| 4,992,084 A | * | 2/1991 | Von Blucher et al. | 96/153 X |
| 5,033,465 A | * | 7/1991 | Braun et al. | 55/524 X |
| 5,078,132 A | | 1/1992 | Bruan et al. | 128/206 |
| 5,256,476 A | * | 10/1993 | Tanaka et al. | 55/524 X |
| 5,332,426 A | | 7/1994 | Tang et al. | 96/153 |
| 5,453,118 A | | 9/1995 | Heiligman | 96/147 |
| 5,478,377 A | * | 12/1995 | Scavnicky et al. | 96/154 X |
| 5,505,892 A | | 4/1996 | Domme | 264/29.6 |
| 5,665,148 A | | 9/1997 | Muhlfeld et al. | 96/153 |
| 6,277,178 B1 | * | 8/2001 | Holmquist-Brown et al. | 96/135 |

FOREIGN PATENT DOCUMENTS

| | | |
|---|---|---|
| DE | 3204022 | 8/1983 |
| EP | 0554224 | 8/1993 |

* cited by examiner

Primary Examiner—Robert H. Spitzer
(74) Attorney, Agent, or Firm—Jacobson Holman PLLC

(57) ABSTRACT

The invention provides a solid filter body for a filter unit, including a sintered composition of adsorbing materials containing activated carbon having a particle size in the range of from 4 to 100 mesh, and a binder in the form of thermoplastic powder having a particle size in the range of from 10 to 250 mesh, the ratio of binder to adsorbent being less than 25% by weight, and the composition being sintered at a temperature below 250° C. The invention further provides a fluid filter unit including a casing having inlet and outlet openings housing the solid filter body and a method for manufacturing the solid filter body.

6 Claims, 1 Drawing Sheet

FILTERING DEVICE AND CARTRIDGES FOR FLUIDS AND GASES

FIELD OF THE INVENTION

The present invention relates to a filter body, a sintered filter unit and to a method for the manufacture of a filter body and filtering unit. More particularly, the invention relates to a reliable, mobile and easily handled sintered filter unit to be used in systems for protecting enclosed spaces such as rooms, shelters, vehicles, tents, containers and the like, against the penetration of contaminated fluid.

BACKGROUND OF THE INVENTION

As is known, air and other gases are usually filtered continuously, by causing the gas to pass through a thick filter medium by application of pressure or vacuum. In household applications, air filters are used in which the medium in the filter units may be glass fibers impregnated with oil for retaining removed dust particles. These filter units are replaced when they become clogged.

Filters may be classified according to the nature of the driving force causing the filtration, such as gravity filters, pressure filters and vacuum filters.

Many types of filters are known for filtering gases. One such filter, described in German Patent Application No. 3204022, uses a loose filling of granules of an adsorbent medium such as activated carbon, placed between a pair of porous walls that retain the granular material. The drawback of such a filter is the fact that there is no internal cohesion of any kind, neither of the granulate, its flow, nor its filtering properties in use; the problems of granulating the activated carbon, its flow and its filtering properties in use also being difficult to check.

In U.S. Pat. No. 3,645,072, there is described a filter formed by bonding and molding a granular activated carbon with a frame having U-shaped channels. The bonded, activated carbon body may be reinforced with a wire or other net, and may contain areas with reduced thickness in order to minimize pressure drop.

In U.S. Pat. No. 5,505,892, there is described a process for the manufacture of a filter unit made from a molded adsorbent element which is permeable to gases. Standard gas/liquid filters are made from a housing containing a loosely filled, mechanically compressed granulate. Granules of an adsorbent medium, preferably activated carbon, are mixed with a granular organic thermoplastic binder medium in a dry state. The resultant dry, granular mixture is put in a mold, compacted, and heated while substantially excluding air from it, to a temperature above the plastic range of the binder medium.

Standard gas/liquid filters are made of a rigid housing, containing loosely filled, mechanically compressed, fixed adsorbent granulate. The granulate is held under pressure between screens, using any spring system which requires a rigid, therefore quite expensive, housing. Such housings are usually made of metal. Furthermore, these filters must be installed only in a particular configuration, determined by the respective orientation. Normally, these filters are also sensitive to shock and other mishandling.

DISCLOSURE OF THE INVENTION

It is an object of the present invention to provide a simple, compact filter unit which can be safely and reliably used, even by untrained persons.

It is another object of the present invention to use known, standard materials which can be easily obtained.

In accordance with the present invention, there is therefore provided a solid filter body for a filter unit, comprising a sintered composition of adsorbing materials containing activated carbon having a particle size in the range of from 4 to 100 mesh, and a binder in the form of thermoplastic powder having a particle size in the range of from 10 to 250 mesh, the ratio of binder to adsorbent being less than 25% by weight; said composition being sintered at a temperature below 250° C.

The invention further provides a fluid filter unit, comprising a casing having inlet and outlet openings housing a solid filter body made of a sintered composition of adsorbing materials containing activated carbon having a particle size in the range of from 4 to 100 mesh, and a binder in the form of thermoplastic powder having a particle size in the range of from 10 to 250 mesh, the ratio of binder to adsorbent being less than 25% by weight; said composition being sintered at a temperature below 250° C.

The invention still further provides a method of manufacturing a solid filter body, said method comprising providing granulated adsorbing material containing activated carbon having a particle size in the range of from 4 to 100 mesh; providing a binder in the form of thermoplastic powder having a particle size in the range of from 10 to 250 mesh, the ratio of binder to adsorbent being less than 25% by weight; and sintering said adsorbing material and said binder at a temperature below 250° C.

BRIEF DESCRIPTION OF THE DRAWING

The invention will now be described in connection with certain preferred embodiments with reference to the following illustrative figure, so that it may be more fully understood.

With specific reference now to the figure in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawing making apparent to those skilled in the art how the several forms of the invention may be embodied in practice.

In the drawing:

FIG. 1 is a cross-sectional view of the filter unit according to the present invention.

DETAILED DESCRIPTION OF PREFERRED EMBODIMENTS

Figure 1:
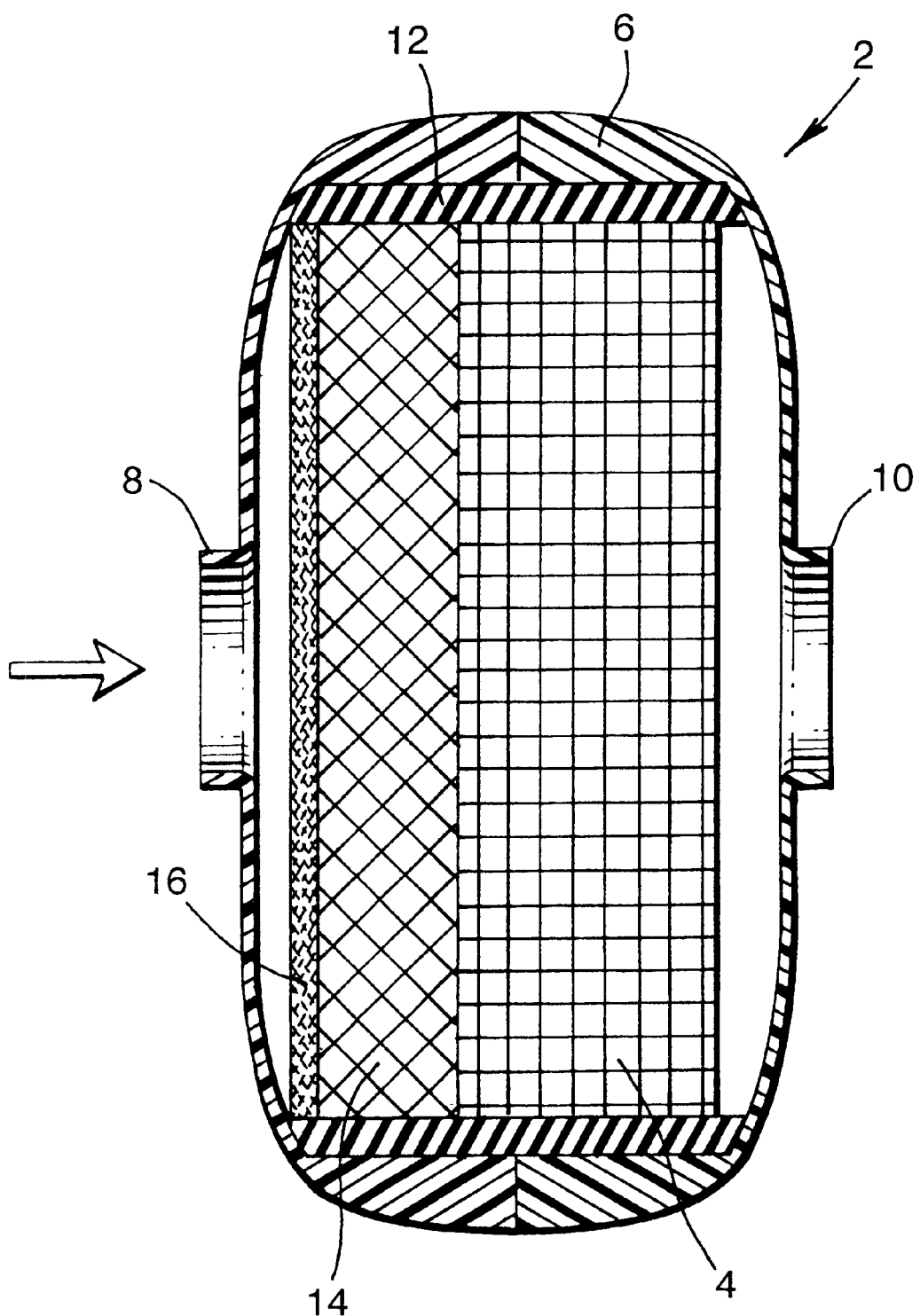

As shown in FIG. 1, the filter unit 2 preferably comprises a filter body 4, obtained in a special process; a plastic housing constituting a shock-resistant casing 6 having inlet and outlet openings 8 and 10, said housing being inexpensive, light- and shock-resistant; and a seal 12, which also acts as a shock absorber. The filter unit 2 further optionally includes an aerosol filter 14, made of fiberglass or a cellulose media and having an efficiency of between 99.97–99.999%, used for filtering small particles of 0.3 μm. In some cases, the aerosol filter is not required.

Filter unit 2 may also contain a dust filter 16, made generally from glass fibers or a synthetic material, normally non-woven and having an efficiency of between 60–99%. Generally, such a dust filter is for filtering out dust, insects, etc. Its inclusion, however, is only optional, depending upon the requirements of the filtering task.

The main part of the invention is the solid filter body 4, which is a self-supported, rigid item not requiring any expensive supporting parts such as a metal housing, screens or springs, and which can withstand a free fall from a height of at least 65 cm without cracking. The filter body is obtained from an adsorbent granulated material, such as activated carbon. The adsorbent should be in maximum contact with the contaminated fluid flowing therethrough, providing no possibility of a bypass even when a minimum amount of binder is used.

Advantageously, the filter body is processed by contaminating the preheated, granulated adsorbing material with quite a small amount of a rather fine, granulated thermoplastic material such as polyolefin, polystyrene or polyamide, preferably in an amount of about 7% by weight. The material is then pressed into a solid block.

The above-mentioned choice of various thermoplastics materials as binders, enables the filter body 4 to be made either stiffer or more flexible, according to any requirement.

In order to obtain a maximum adsorption surface, together with maximum stiffness of the filter body, the following factors should be considered: (a) the relation of the masses of adsorbent and binder; and (b) the relation of particle sizes of the adsorbent and binder.

In comparison with the teachings of European Patent 0554224 or U.S. Pat. No. 5,505,892, the present invention enables the use of only relatively small amounts of binder, even less than 7%, which is most preferable in order not to block the adsorbent. Thus, the need for an additional carbonizing process is avoided. Contrary to the technology described in these Patents, a most important factor for ease of processing according to the present invention, is the sintering temperature, which should be below 250° C.

According to another embodiment of the present invention, it is possible also to use other adsorbents. In addition, if the application is air, a drying step is sufficient. In any case, it is very important to obtain a very good mechanical stability of the filter body 4 on the one hand, and on the other hand, a large adsorption surface, without using high processing temperatures.

Another feature of the invention is the use of a special shock-absorbing dry seal, fitting the filter body into the shock-resistant casing 6. Generally, the adsorbent is sealed by a more or less liquid monomer, which is able to fill the gaps between the casing and the adsorbent. Due to chemical reaction, the liquid monomer increases its viscosity and afterwards behaves like a rubber seal.

According to another aspect of the present invention, the seal 12 to be used is prefabricated in a dry form and thus, due to its predetermined shape, it will act also as a shock absorber. The shock-absorbing seal 12 simultaneously also provides a seal between case 6 and filter body 4.

It will be evident to those skilled in the art that the invention is not limited to the details of the foregoing illustrated embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A fluid filter unit, comprising:
    a shock-resistant casing, having two lateral side walls, at least one peripheral surface delimited by said side walls and inlet and outlet openings made in said side walls,
    a solid filter body having lateral side walls and at least one peripheral surface, said body being sized to fit inside the casing, said filter body being made of a sintered composition of absorbing materials containing activated carbon having a particle size in the range of from 4 to 100 mesh, and a binder in the form of thermoplastic powder having a particle size in the range of from 10 to 250 mesh; the ratio of binder to absorbing material being less than 7% by weight, and
    said composition being sintered and solidified into said filter body at a temperature below 250° C., and
    a seal interposed between an inner peripheral surface of said at least one peripheral surface of said casing and an outer peripheral surface of said at least one peripheral surface of said filter body, to substantially prevent direct contact between said filter body and the casing, thereby said seal acting as a shock absorber.

2. The fluid filter unit according to claim 1 further comprising an aerosol filter member interposed between one of said lateral side walls and the solid filter body for filtering small particles of substantially 0.3 µm.

3. The filter unit according to claim 2, wherein said aerosol filter member is made of fiberglass.

4. The filter unit according to claim 2, wherein said aerosol filter member is made of cellulose media.

5. The filter unit according to claim 1, further comprising a dust filter member interposed between one of said lateral side walls and the solid filter body.

6. The filter unit according to claim 5, wherein said dust filter member is made of a non-woven, synthetic media.

* * * * *